(12) United States Patent
Sharon et al.

(10) Patent No.: US 11,141,022 B2
(45) Date of Patent: Oct. 12, 2021

(54) CONTAINER UNIT COMPRISING TWO CONTAINERS

(71) Applicants: Igal Sharon, Caesarea (IL); Tal Sharon, Caesarea (IL); Nehama Sharon, Caesarea (IL)

(72) Inventors: Igal Sharon, Caesarea (IL); Tal Sharon, Caesarea (IL); Nehama Sharon, Caesarea (IL)

( * ) Notice: Subject to any disclaimer, the term of this patent is extended or adjusted under 35 U.S.C. 154(b) by 0 days.

(21) Appl. No.: 15/516,759

(22) PCT Filed: Sep. 30, 2015

(86) PCT No.: PCT/IL2015/050981
§ 371 (c)(1),
(2) Date: Apr. 4, 2017

(87) PCT Pub. No.: WO2016/055997
PCT Pub. Date: Apr. 14, 2016

(65) Prior Publication Data
US 2017/0296001 A1 Oct. 19, 2017

Related U.S. Application Data

(60) Provisional application No. 62/059,910, filed on Oct. 5, 2014.

(51) Int. Cl.
*A47J 43/27* (2006.01)
*B65D 21/02* (2006.01)
(Continued)

(52) U.S. Cl.
CPC .......... *A47J 43/27* (2013.01); *B65D 21/0231* (2013.01); *B65D 81/3211* (2013.01); *A61J 1/2093* (2013.01); *A61J 9/00* (2013.01)

(58) Field of Classification Search
CPC . A47J 43/27; A61J 1/2093; A61J 9/00; B65D 81/322; B65D 21/0231; B65D 21/0209; B65D 81/3205; B65D 81/3211
(Continued)

(56) References Cited

U.S. PATENT DOCUMENTS 2,488,611 A * 11/1949 Stallings ............. A47J 41/0083
206/509
2,641,374 A * 6/1953 Der Yuen ........... B65D 21/0231
206/509
(Continued)

FOREIGN PATENT DOCUMENTS

CH         330424 A     6/1958
CN    200948904 Y     9/2007
(Continued)

OTHER PUBLICATIONS

International Search Report and Written opinion for PCT App. No. PCT/IL2015/050981 dated Dec. 16, 2015, 5 pgs.
(Continued)

*Primary Examiner* — Steven A. Reynolds
(74) *Attorney, Agent, or Firm* — Mark David Torche; Patwrite Law

(57) ABSTRACT

The present invention provides a container system that allows a user to store ingredients of a formulation in separate individual containers that can be assembled easily into an extended single compartment container, thereby enabling to mix the ingredients, in a gentle shaking or swirling manner, to form the formulation prior to use.

13 Claims, 10 Drawing Sheets

(51) Int. Cl.
*B65D 81/32* (2006.01)
*A61J 1/20* (2006.01)
*A61J 9/00* (2006.01)

(58) Field of Classification Search
USPC .......................... 220/23.83, 23.86; 206/219
See application file for complete search history.

(56) References Cited

U.S. PATENT DOCUMENTS

| | | | |
|---|---|---|---|
| 3,190,619 A | 6/1965 | Penney | |
| 3,337,039 A | 8/1967 | Knittel | |
| 4,818,114 A | 4/1989 | Ghavi | |
| 5,186,323 A * | 2/1993 | Pfleger | B65D 81/3211 |
| | | | 206/221 |
| 5,244,106 A | 9/1993 | Takacs | |
| 5,259,509 A | 11/1993 | Boal | |
| 5,361,918 A * | 11/1994 | Mason | A61J 1/20 |
| | | | 215/11.1 |
| 5,493,774 A | 2/1996 | Grabenkort | |
| 5,533,553 A * | 7/1996 | Vesborg | B65D 1/0223 |
| | | | 141/319 |
| 6,135,275 A | 10/2000 | Kelders | |
| 8,544,649 B2 * | 10/2013 | Rivera | B65D 21/0231 |
| | | | 206/508 |
| 8,695,826 B2 * | 4/2014 | Furey | B65D 1/34 |
| | | | 206/503 |
| 9,278,781 B1 * | 3/2016 | Boldis | B65D 21/0231 |
| 2010/0237079 A1 * | 9/2010 | Sharon | B65D 25/08 |
| | | | 220/502 |
| 2011/0198351 A1 | 8/2011 | D'Amato | |
| 2012/0298659 A1 | 11/2012 | Bogner | |
| 2012/0330267 A1 | 12/2012 | Domkowski | |
| 2014/0027336 A1 * | 1/2014 | Bou Mezrag | B65D 21/0231 |
| | | | 206/519 |

FOREIGN PATENT DOCUMENTS

| | | |
|---|---|---|
| DE | 2459683 A1 | 10/1975 |
| FR | 2970951 | 8/2012 |
| JP | 04329955 A | 11/1992 |

OTHER PUBLICATIONS

International Preliminary Report on Patentability for PCT App. No. PCT/IL2015/050981 dated Sep. 29, 2016, 4 pgs.
Extended European Search Report, European Serial No. 15849134, dated Mar. 23, 2018, 8 pgs.
Chinese Office Action, Chinese Serial No. 201580054156, dated Jan. 1, 2018, 4 pgs.

* cited by examiner

CONTAINER UNIT COMPRISING TWO CONTAINERS

FIELD OF THE INVENTION

The present invention relates to the field of containers. More particularly, the invention relates to a container unit for quickly one-stop plugging-in or coupling to another container for combining the volume of both containers, wherein each container may separately store a component of a formulation for mixing prior to use.

BACKGROUND OF THE INVENTION

The process of many formulation preparation reconstitute for solution require a gentle shaking or swirling of a bottle in order to prevent the generation of unwanted bubbles within the mixed solution, as it may cause excessive pressure in the digestive system, as well as an ungently shaking may harm delicate ingredients during the preparation of the formulation in the bottle. Also, the World Health Organization (WHO) recommends that in order to prepare a baby formula using a feeding bottle, the formula should be mix thoroughly with water by gently shaking or swirling the bottle. However, the current feeding bottles have limited space for mixing the formula in such a manner, as the water in the feeding bottle and the added amount of formula may occupy most of the bottle's volume. Due to the limited mixing space, one usually need to apply excessive force to make sure that the formula mixed well. This may apply to different powder formulations which are sensitive to aggressive mixing, such as baby formula, protein powder, medical substances, etc.

It is an object of the present invention to provide a container unit which is capable of enabling engagement with a second container for combining the volume of both containers, and thereby expanding the available mixing space and allowing a gently shaking or swirling of the bottle.

It is another object of the present invention to provide a container unit which is suitable for sealing coupling to containers with openings of different sizes.

Other objects and advantages of the invention will become apparent as the description proceeds.

SUMMARY OF THE INVENTION

The present invention provides a container system that allows a user to store ingredients of a formulation in separate individual containers that can be assembled easily into an extended single compartment container, thereby enabling to mix the ingredients, in a gentle shaking or swirling manner, to form the formulation prior to use. The container system may consist of two basic types of assembly units: a dispensing unit and a main container unit. The dispensing unit is a novel container unit which can store a first ingredient (e.g., powder) and the main container unit is a second container which can store a second ingredient (e.g., liquid). Each of these units are separate containers that may be assembled together readily to form an extended single compartment container by combining the volume of both units, and thereby expanding the available mixing space.

For example, a dispensing unit and a main container unit may be assembled together to form a single container. Each unit may contain a different component of a formulation in any predetermined quantity. An opening at the top end of the dispensing unit may be adapted and configured to engage an opening of a main unit such as an opening at the neck portion of a baby feeding bottle, or a dosage device, etc. In such embodiment the top opening of the dispensing unit may be coupled to the top opening of the main container unit.

The opening at the top end of the dispensing unit may typically be sealed so that the dispensing unit's content can be protected from any contamination during storage. And because this seal must be removed prior to the engagement with the main container unit and dispense the contents into the main container unit, the seal is preferably configured to be readily removed or broken, e.g., a breakable or peelable seal. The breakable or peelable seal may comprise a membrane where the membrane may be a foil or a non-metallic membrane, such as a plastic or other polymer membrane, and may have a single-layer or a multi-layered laminate structure. Such membrane seal may be heat sealed along the rims of the dispensing unit's open end so that it may be peeled off to engage the main container unit. The seal may further comprise a screw-on or pressure closing cap.

It is to be appreciated that because the number and size of the dispensing unit and the main container units may be varied in unlimited combinations, this assembly system provides the flexibility of allowing the user to prepare varying quantities of a given formulation as well as to prepare a complex formulation with multiple components of varying quantities. Each of the assembly units may be provided in various sizes to accommodate different quantities of each component of a formulation where appropriate.

Another advantage of using the dispensing unit of this invention over prior containers is that the system provides longer storage-life for the components of a formulation and in most applications there is no need for special storage conditions of the system and/or components such as refrigeration. Because each component of a formulation may be stored in separately sealed dispensing units (i.e., separately sealed container units).

According to an embodiment of the invention, the bottom end of the dispensing unit may be adapted and configured to interlock with a top end of an additional dispensing unit in order to assemble a multi-compartment container assembly. Such an assembly may include a plurality of dispensing units that are searily connected one above the other.

According to an embodiment of the invention, a dispensing unit may be a container unit for storing a component of a formulation with an opening at each end of the container body. The top open end of the dispensing unit may be adapted and configured to sealingly engage an opening of the main container unit in order to assemble an extended single compartment container. To form an extended single compartment container, the top end of the dispensing unit is inserted into the opening of the main container unit thereby each units form a separate portion of the resulting extended single compartment container. To form the seal between the assembly units, the outer surfaces near the top open end of the dispensing unit may be provided with one or more sealing ridges. The sealing ridges form fluid-tight seals with the inside wall surfaces of the opening of the main container unit when the top end of the dispensing unit is inserted into the opening of the main container unit, whereby the inside of the dispensing unit is in flow-communication with the main container unit through the top open end of the dispensing unit and the opening of the main container unit.

The present invention also provides processes for preparing dispensing units for holding and storing one or more ingredients of a formulation separately. The process includes:

a) providing a dispensing unit having a housing and an opening at its top end; and b) introducing a first component of a formulation into the dispensing unit through the opening and sealing that end;

After the user has used the dispensing units, the empty dispensing units can be reused. The empty dispensing units may be refilled either through the top opening or thorough an optional bottom opening which can be wider than the top opening. The refilling process would be same as the processes described above.

In one aspect, the present invention relates to a container unit for engaging with a second container, comprising: a) a container body having a neck portion, wherein said neck portion includes a first sealable opening; and b) a coupling mechanism disposed at said neck portion for enabling engagement with said second container for combining the volume of said container unit and said second container, wherein said coupling mechanism includes: i) a first ring-like seal located at an upper end of said neck and sized to engage an inner wall of an opening of said second container; and ii) a first shoulder, spaced apart from said first seal, sized and configured to sit on an open edge of said second container, wherein said shoulder is in removable abutting relation with the open edge of said second container, while said neck portion is inserted by a maximum extent through the opening of said second container, thereby defining the maximum extent of said first ring-like seal.

According to an embodiment of the invention, the ring-like seal is flexible.

According to an embodiment of the invention, the container unit further comprises a second shoulder protruding laterally from the container body at a lower end of said neck portion and spaced apart from the first shoulder, wherein said second shoulder sized and configured to sit on an open edge of a third container, thereby enabling engagement with variety opening sizes of containers.

According to an embodiment of the invention, the container unit further comprises a flexible ring-like seal adapted to be situated on the neck portion in the space between the first ring-like seal and the first shoulder, wherein said detachable ring-like seal sized to engage an inner wall of an opening of a third container such that the second shoulder and said detachable ring-like seal forms a universal coupling mechanism that enables engagement with variety of containers. The flexible ring-like seal is detachable or can be provided as an integral part of the neck portion (e.g., by double injection or over mold processes).

According to an embodiment of the invention, the container unit further comprises a second sealable opening located at a bottom end of the container body and a corresponding bottom lid for closing or reopening said second sealable opening.

According to an embodiment of the invention, the container unit further comprises an upper lid adapted for closing or reopening the first sealable opening.

According to an embodiment of the invention, the upper lid and a bottom portion at the container body form a stackable mechanism adapted to stack plurality of container units one above the other, wherein the bottom of each container unit being configured to allow the container unit to be interlocked with the top of each upper lid such that two or more container units are connectable to each other as well as easily disassembled.

According to an embodiment of the invention, the bottom portion includes a second sealable opening and a corresponding bottom lid for closing said second sealable opening, such that the upper lid and said bottom lid the bottom of each container unit being configured to allow the container unit to be interlocked with the top of each upper lid, thereby forming the stackable mechanism.

According to an embodiment of the invention, the first shoulder has a conic form.

According to an embodiment of the invention, the first sealable opening is sealed by a laminate, a cover cup or combination of both.

In another aspect, the container body and the neck portion are separate units capable of being sealably coupled to form the container unit.

The invention will now be illustrated in some specific embodiments directed to a dispensing unit (i.e., a container unit) fitted with a baby feeding bottle as the main container unit (i.e., a second container unit). It will be appreciated by one of ordinary skill in the art that the same principle is also applicable to other form or types of containers where it is desired to store components of formulations separately in individual containers and then assemble the individual assembly units into an extended single compartment container which may be mixed to form and dispense the formulation.

DETAILED DESCRIPTION OF THE INVENTION

Reference will now be made to several embodiments of the present invention, examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures illustrated herein may be employed without departing from the principles of the invention described herein.

The present invention relates to a container unit having a coupling mechanism for quick sealing coupling with a second container. In particular, this container unit is useful when each container stores ingredients that are to be later combined for consumption in the storage container formed by combining the volume of both containers, such as a component of a formulation for mixing prior to use (e.g., for mixing powdered formula and liquid). According to an embodiment of the invention, the coupling mechanism is integrally formed with the container unit. In another embodiment, the coupling mechanism is suitable for sealing coupling to containers with openings of different sizes (i.e., a universal coupling mechanism), thereby enabling to combine the volume of the container unit with different second container. For example, the container unit may be used as a dispenser for different types of powder formulations to mix with a corresponding liquid such as water stored in another container. The containers are connectable to each other, wherein each container is independent.

Figure 1:
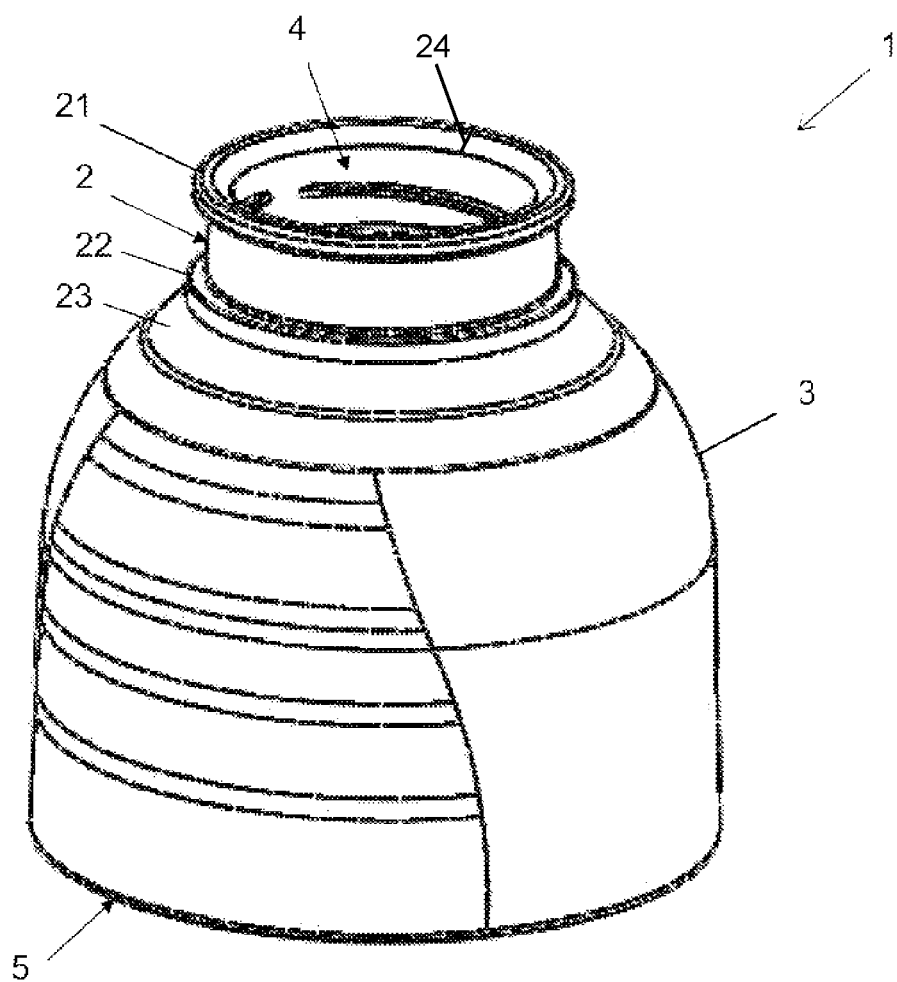
FIG. 1 schematically illustrates a perspective view of a container unit, according to an embodiment of the invention.

FIG. 1 shows a container unit that can be used in conjunction with the invention. The container unit illustrated in this figure is particularly convenient because it can be applied as an add-on unit or a plug-in unit to existing containers (such as infant's feeding bottles) without the need to carry out any alterations in the structure of such existing containers. The container unit generally indicated by numeral 1 in the figure comprises a container body 3, a neck portion 2 with a mouth or opening 4, and a coupling mechanism disposed at the neck portion 2 as defined by a ring-like seal 21 and a first shoulder 22 and/or a shoulder 23. The neck portion 2 may be narrower than the container body 3.

Figure 10A:
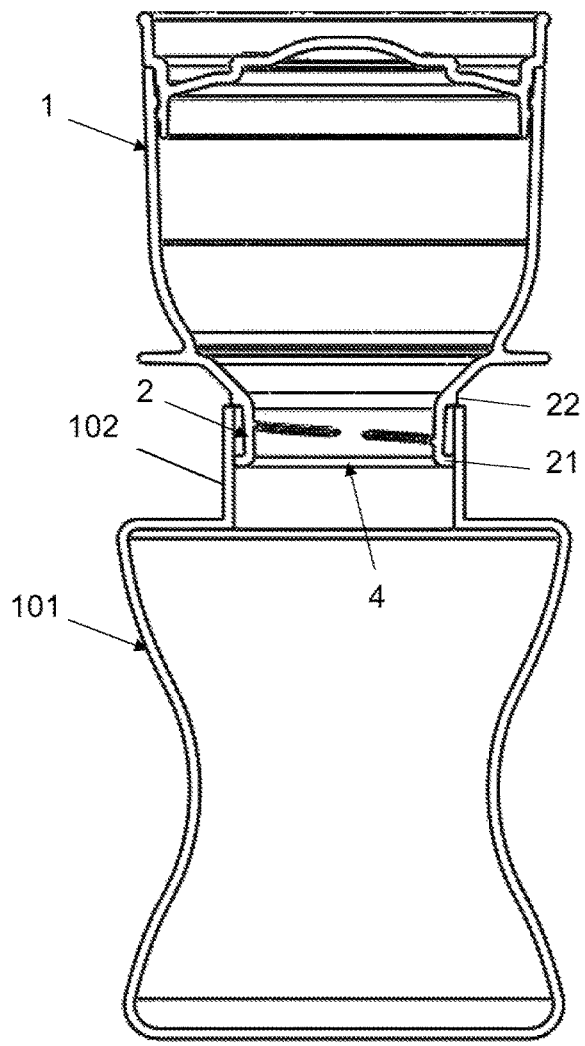
FIGS. 10A and 10B schematically illustrate in a cross-sectional view the engagement of the container unit with a second container, according to some embodiments of the invention.
Figure 10B:
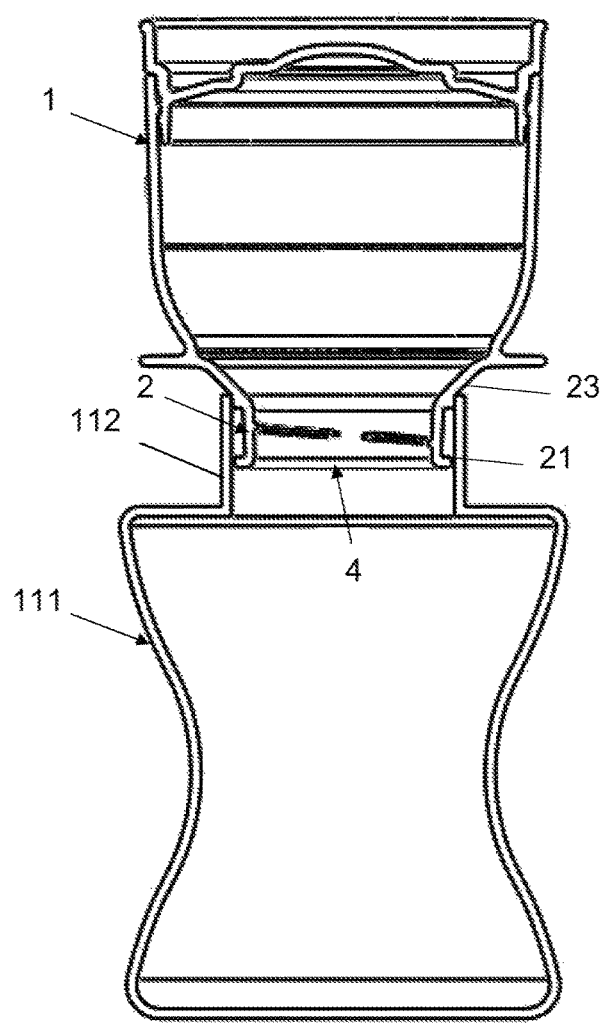

The coupling mechanism enables engagement of the container unit 1 with a second container (e.g., see containers 101 and 111 as shown in FIGS. 10A and 10B, respectively) for combining the volume of the container unit 1 and the second container 101 or 111. The coupling mechanism includes the ring-like seal 21 and the first shoulder 22 (or in some cases shoulder 23 as shown also with respect to FIG. 10B). The ring-like seal 21 is located at an upper end of the neck portion 2 (at the edge of opening 4) and sized to engage an inner wall of an opening at a neck portion 102 of the second container 101 (see FIG. 10A). The first shoulder 22 is spaced apart from the ring-like seal 21, and it sized and configured to sit on an open edge of the second container 101. The shoulder 22 is in removable abutting relation with the open edge of the second container 101, while the neck portion 2 is inserted by a maximum extent through the opening of the second container 101. The shoulder 22 is spaced apart from the ring-like seal 21 such that it will prevent the ring-like seal 21 to deviate from a corresponding region of the neck portion 102 of the second container 101.

According to an embodiment of the invention, the ring-like seal 21 is a sealing disk-like flange formed of flexible material, and sized somewhat wider than the opening of the second container 101 so as to seal the opening of the second container 101 and, preferably, create a vacuum, when inserted therein. In this way, at least the outer periphery of the seal 21 sealingly engages the inner wall of the second container opening adjacent thereto. The shoulder 22 is sized somewhat larger than the opening of the second container 101 and it seals against the upper surface of the opening of the second container at the neck portion 102. In this embodiment, the surface of the shoulder 22 which is in abutting relation with the opening of the second container 101 is substantially planar. According to some embodiments, in case the shoulder 22 passes through the opening of the second container (as shown in FIG. 10B), than shoulder 23 may be used to limit the insertion of the neck portion 2. Shoulder 23 may have a conic form.

According to an embodiment of the present invention, the ring-like seal 21 may include at least one perforation (i.e., a one-way valve) 24 in order to avoid resistance while inserting the neck portion 2 of container unit 1 into the neck portion of the second container. This might occur due to the generation of air pressure in cases where the neck portion 2 tightly fits the neck portion of the second container (e.g., as shown in FIG. 10A).

Figure 2:
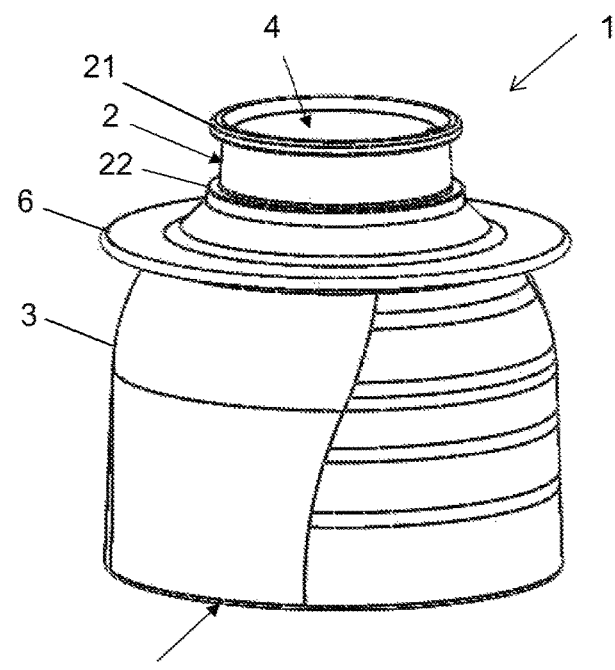
FIG. 2 schematically illustrates a perspective view of a container unit provided with an additional shoulder, according to an embodiment of the invention.
Figure 6:
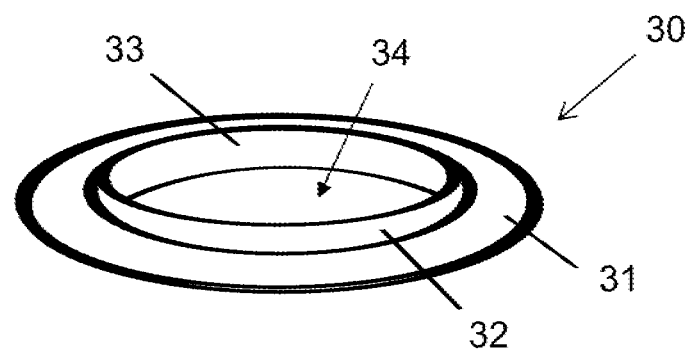
FIG. 6 schematically illustrates a detachable and flexible flange for the container unit, according to an embodiment of the invention.
Figure 7:
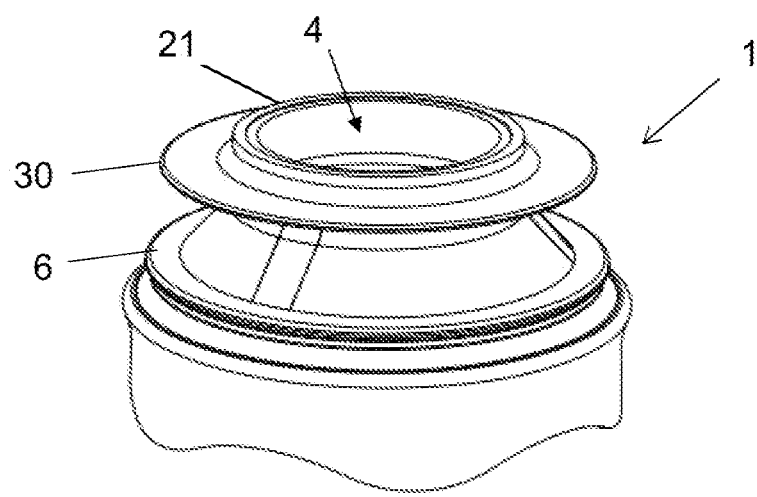
FIG. 7 schematically illustrates the container unit combined with a flexible flange and an additional shoulder, according to an embodiment of the invention.
Figure 9A:
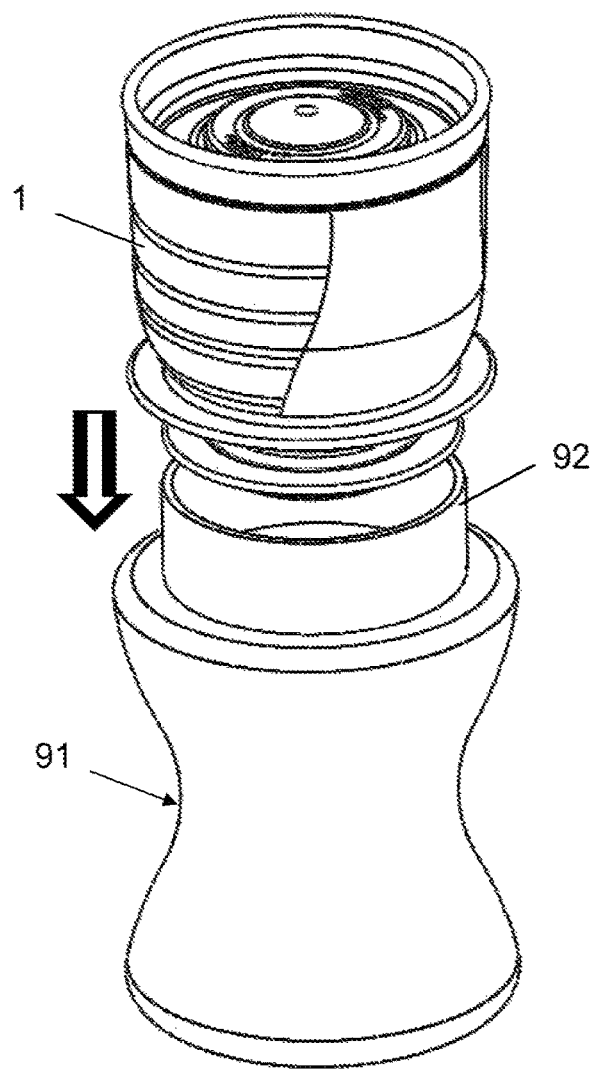
FIGS. 9A and 9B schematically illustrate in a perspective view the engagement of the container unit with a second container, according to an embodiment of the invention.
Figure 9B:
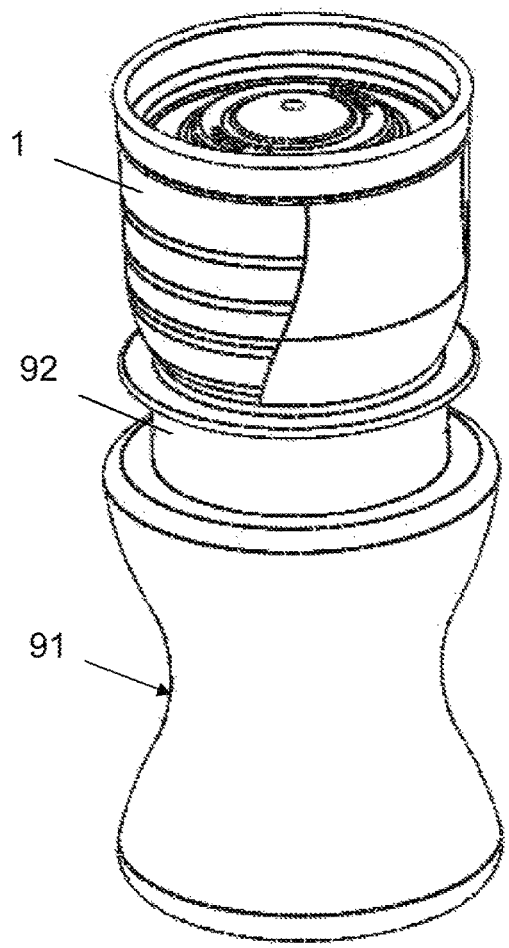
Figure 9C:
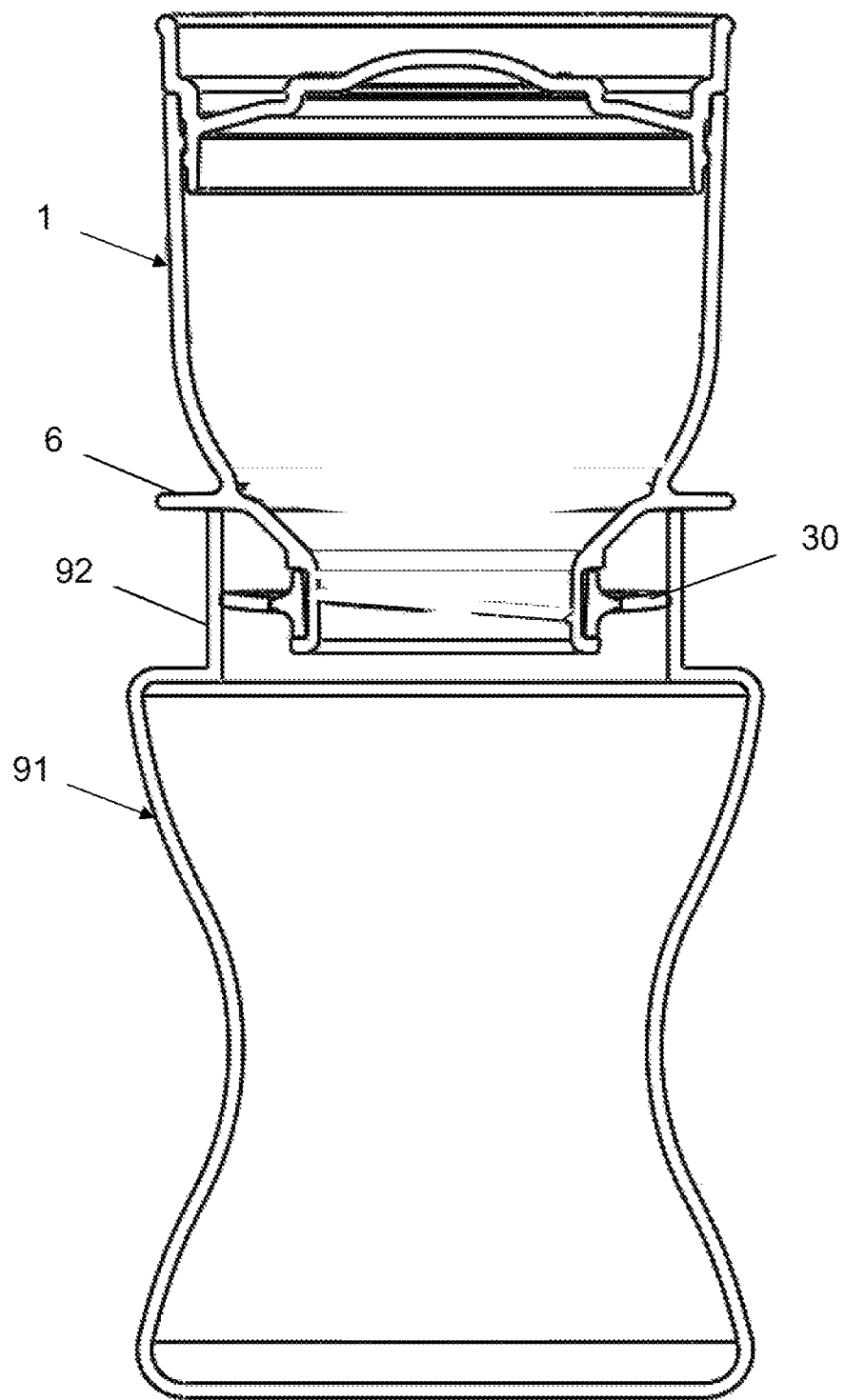
FIG. 9C schematically illustrates in a cross-sectional view the engagement of the container unit with a second container according to an embodiment of the invention.

Referring now to FIG. 2, according to an embodiment of the invention, the container unit 1 further comprises an additional shoulder 6 protruding laterally from the container body at a lower end of the neck portion 2 and may be spaced apart from the first shoulder 22. The additional shoulder 6 sized and configured to sit on an open edge of containers having opening in variety of sizes (e.g., see container 91 in FIGS. 9A-9C). In this embodiment, the container unit 1 may also comprise a flexible ring-like seal that may also be detachable (e.g., the flexible ring-like seal can be in form of a detachable sealing flange 30 as shown in FIG. 6) adapted to be situated on the neck portion 2 in the space between the ring-like seal 21 and the first shoulder 22 (i.e., the inner portion 33 of flange 30 is elastic and adapted to tightly fit the outer peripheral surface of the neck portion 2 by threading the neck portion 2 through the opening 34 of flange 30 until flange 30 tightly sits on the outer surface of the neck portion 2, as shown in FIG. 7). The detachable ring-like seal, such as the detachable sealing flange 30, sized to engage an inner wall of an opening of the second container 91 (as shown in FIGS. 9A-9C) such that the additional shoulder 6 and the detachable sealing flange 30 form a universal coupling mechanism (i.e., one-size coupling mechanism) that enables engagement with variety of containers and which operates in the same manner as the coupling mechanism defined by the by the ring-like seal 21 and the first shoulder 22.

In some embodiments, the neck portion 2 and the container body 3 can be provided as separate units. For example, in such embodiments, the neck portion 2 is provided as an independent unit that may include the flange 30 and the additional shoulder 6 (as shown in FIG. 7) and that can be coupled to a corresponding container body (not shown).

It is a particular feature of the invention that a coupling mechanism of one-size permits coupling of a container to various containers having openings of different sizes. Because of its flexibility, the detachable sealing flange 30 can sealingly engage the inner wall of various size openings of other containers. If the flexible flange 30 is larger in size than the opening of the other container, it will fold against the inner wall of the opening of that other container, so that a larger portion of the surface area of a flexible wing 31 of the flexible flange 30 sealingly engages the inner wall of that other container. If the flexible flange 30 has a size substantially the same as the inner wall of the opening of the other container, the outer edge of the flexible flange 30 will sealingly engage the inner wall of the opening of the other container. However, it will be appreciated, that the quick coupling mechanism can be sized to particularly suit a specific container (as described hereinbefore with respect to FIG. 1). In addition, if desired, additional sealing flanges (not shown) can be provided on the closure mechanism to increase the seal and, if desired, the vacuum created by the closure. In some embodiments, flange 30 may include more than one layer of flexible wing 31, e.g., flange 30 may include three layers of flexible wings 31 located one above the other that all extend from the outer surface 32 of flange 30.

Figure 3:
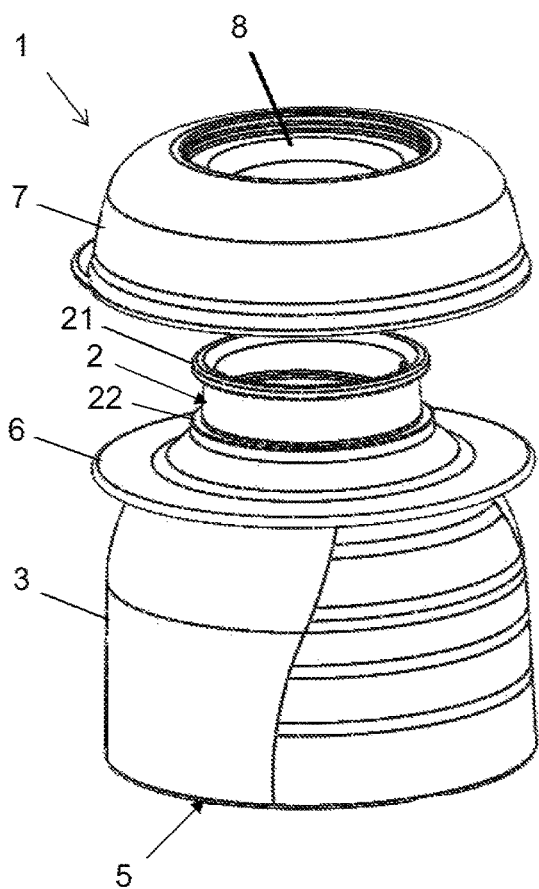
FIG. 3 schematically illustrates a perspective view of a container unit provided with a first lid, according to an embodiment of the invention.

The present invention may also relates to a stackable container system that includes containers and lids that are configured to allow any of the lids to be used on any of the containers, and wherein the bottom of each container interlocks with the top of each lid to allow the containers to be stacked. The container unit 1 may further comprise an upper lid 7 adapted to seal the opening 4 at the neck portion 2, as shown in FIG. 3. The upper lid 7 and the bottom portion 5 of container unit 1 may form a stackable mechanism adapted to stack plurality of container units one above the other. For example, this may be performed by a snap-on or clickable mechanism provided at the top of each upper lid and at the bottom of each container. The upper surface of lid 7 and the surface of the bottom portion 5 are designed in such a way that two container units are easily connectable to each other as well as easily disassembled.

Figure 4:
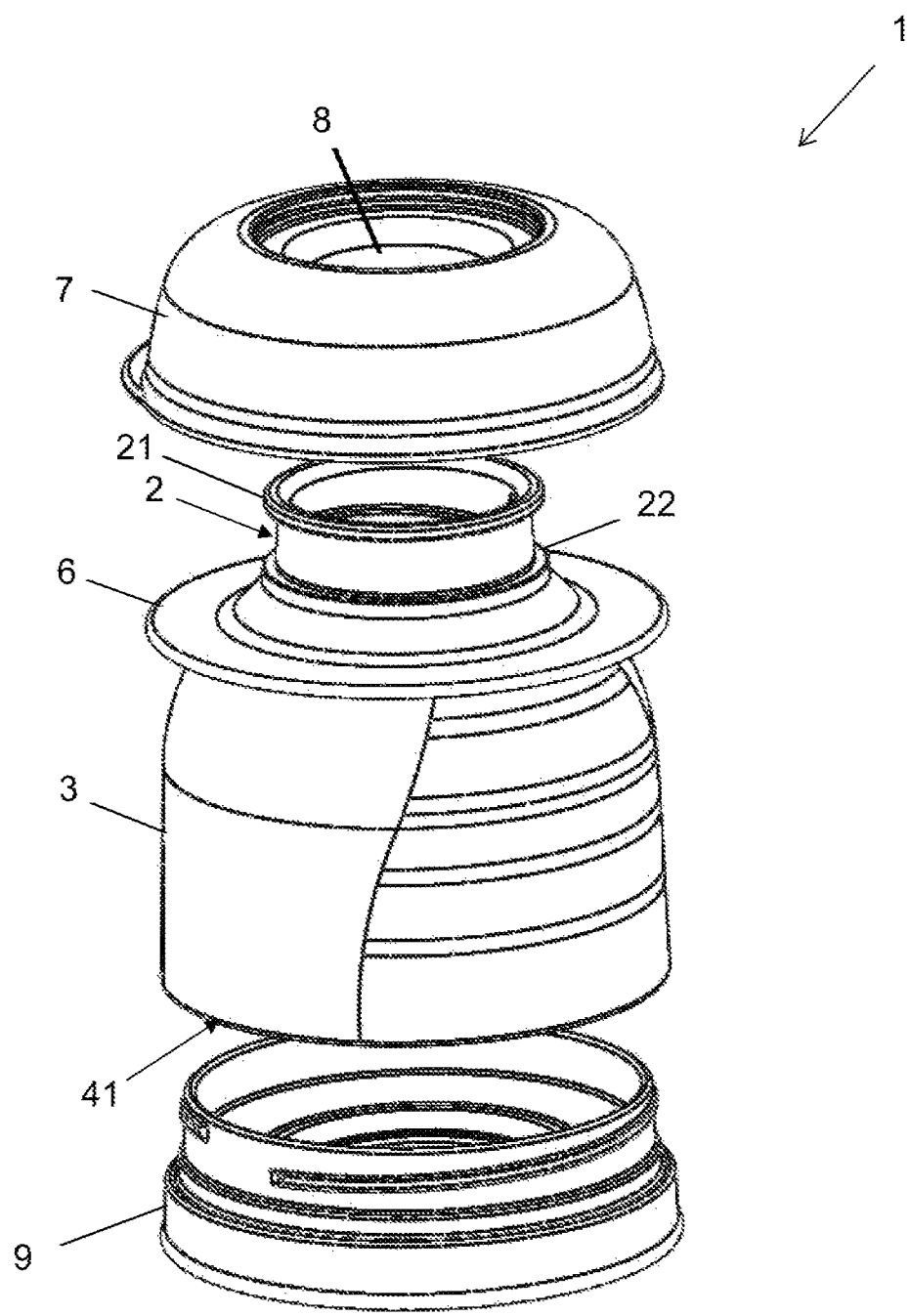
FIG. 4 schematically illustrates an exploded view of a container unit provided with an upper lid and a lower lid, according to an embodiment of the invention.

Referring now to FIG. 4, according to an embodiment of the invention, the container unit 1 further comprises a second opening 41 that can be covered by a second lid 9, which may be located at the bottom portion 5 of unit 1 as indicated in the figure. The second opening 41 may be used to fill container 1 with any desired substance, component or liquid. The second opening 41 may be wider than the first opening 4 (FIGS. 1 and 2) as to enable an easy access to the inner volume of unit 1. The first opening 4 is usually used for dispensing proposes and therefore should be narrower than the second opening 41. However, opening 41 can also be used for dispensing purposes when container unit 1 coupled to the second container in the same way as adding a powder or component to a single container (as both containers act as a single container with an extended volume).

Figure 5:
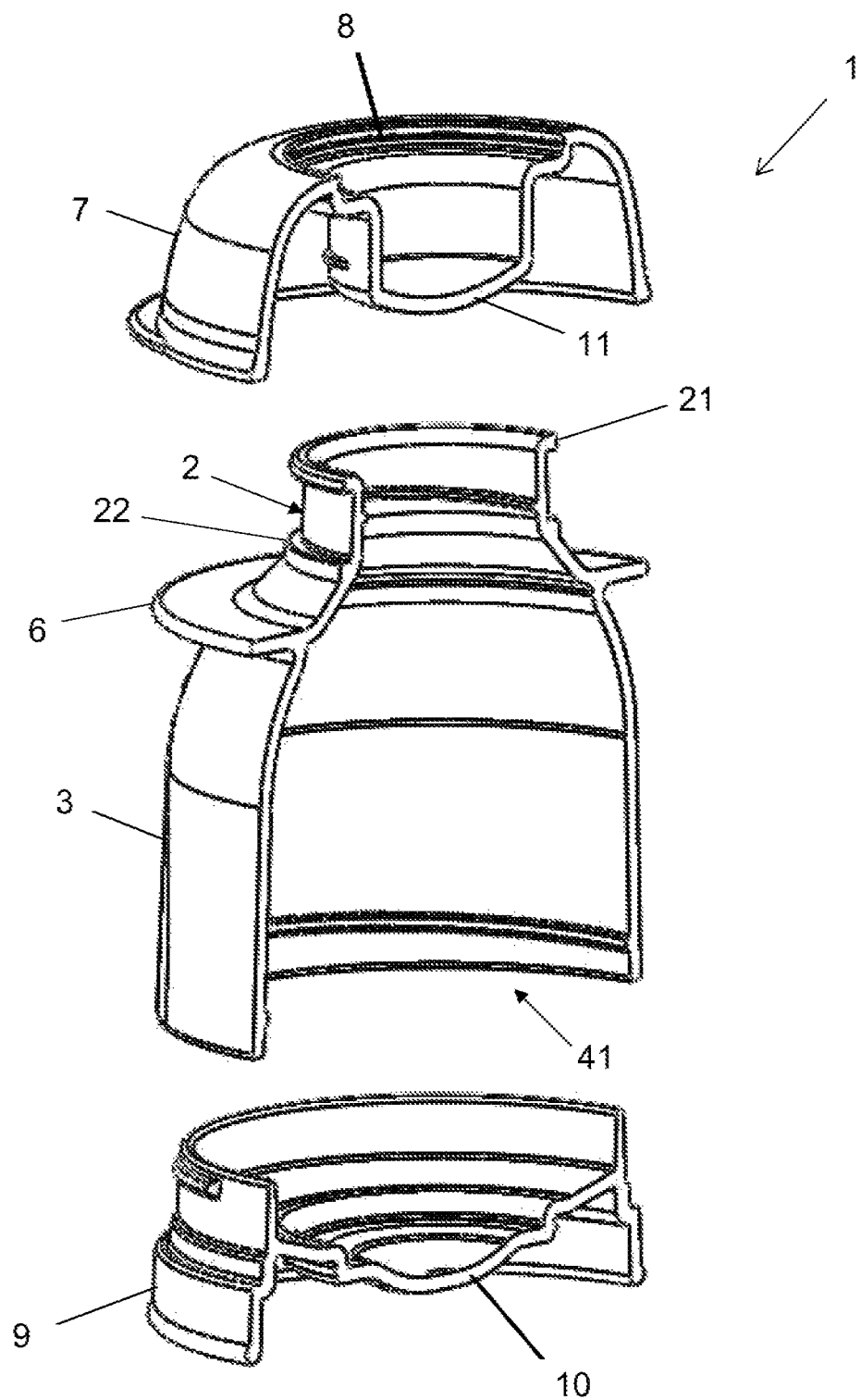
FIG. 5 schematically illustrates a cross-sectional exploded view of a container unit provided with an upper lid and a lower lid, according to an embodiment of the invention.
Figure 11A:
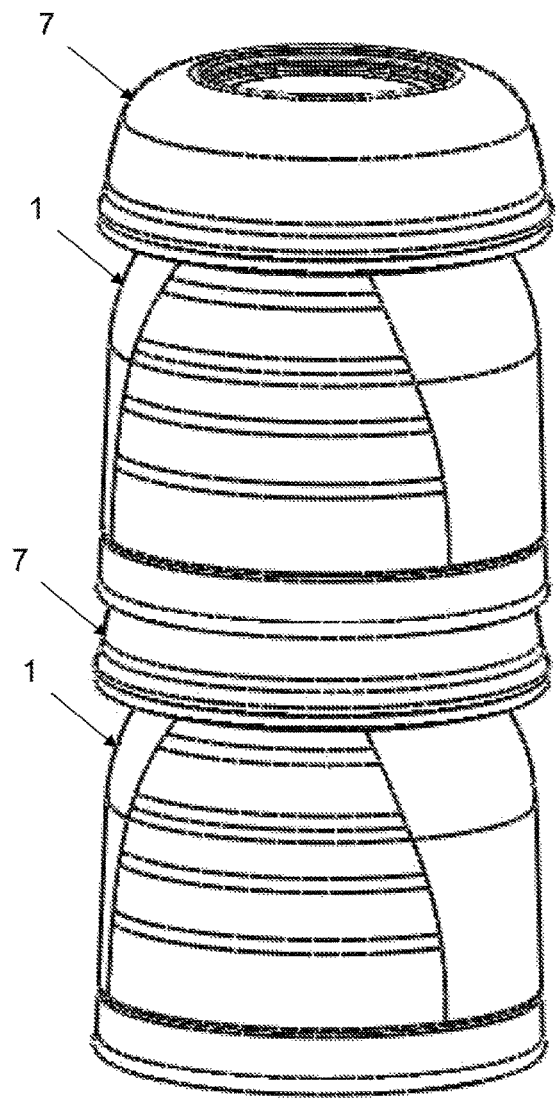
FIG. 11A schematically illustrates two container units connectable to each other, according to an embodiment of the invention.
Figure 11B:
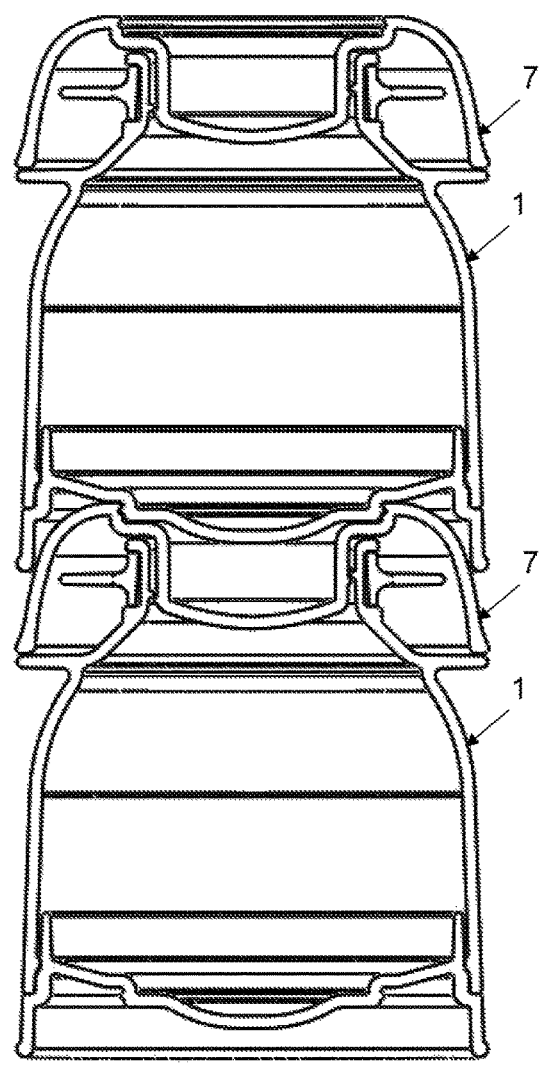
FIG. 11B schematically illustrates the two container units of FIG. 11A in a cross-sectional view.

According to an embodiment of the invention, the lid 7 and the bottom portion 5 of lid 9 may form a stackable mechanism adapted to stack plurality of container units one above the other, independently, such that the bottom of lid 9 stacks upon the upper surface of lid 7 of another container, as shown in FIGS. 11A and 11B. For example, this may be performed by a snap-on or clickable mechanism. FIG. 5 schematically illustrates a cross-sectional exploded view of the container unit 1 together with lids 7 and 9. For example, a male engagement portion 10 of the container adapted to snap-on a corresponding recess portion 8 of lid 7 of another container unit, or vice versa.

Figure 8A:
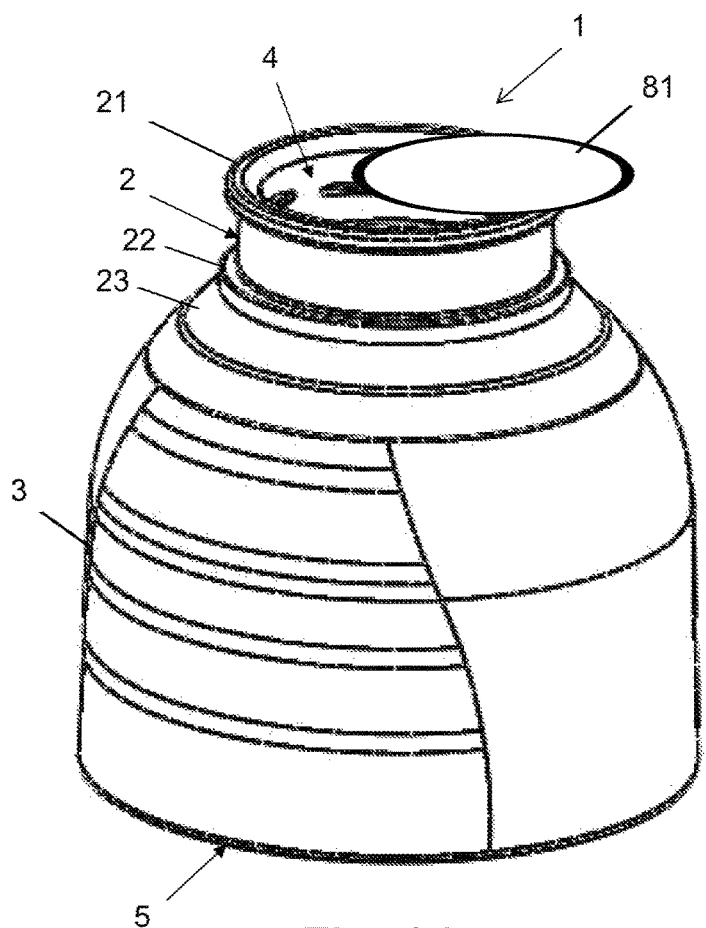
FIG. 8A schematically illustrates a perspective view of the container unit sealed by a laminate, according to an embodiment of the invention.
Figure 8B:
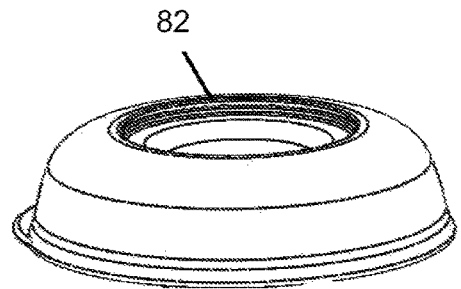
FIG. 8B schematically illustrates an upper lid with a stackable connection arrangement for sealing the container unit, according to an embodiment of the invention.
Figure 8C:
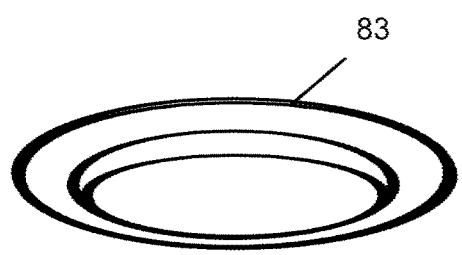
FIG. 8C schematically illustrates a disk cover cup for sealing the container unit, according to an embodiment of the invention.

The following describes variety of cup or lid arrangements for sealing the first opening 4 of container unit 1. FIG. 8A schematically illustrates a perspective view of container unit 1 sealed by a laminate 81, according to an embodiment of the invention. FIG. 8B schematically illustrates an upper lid 82 provided with a stackable connection arrangement for sealing the container unit, according to an embodiment of the invention. FIG. 8C schematically illustrates a disk cover cup 83 for sealing the container unit 1, according to another embodiment of the invention. Cover cup 83 can be made of plastic or other rigid or semi-rigid material. Such sealing arrangements may enable to use the container unit 1 as a capsule that contains a substance or component.

According to one embodiment of the invention, the container unit 1 holds a first substance or component for mixing with a second substance or component in the second container 91 (FIGS. 9A-9C) or 101 (FIG. 10A) when the containers are sealingly coupled to one another. Each container may have one or more removable or frangible covers or caps to seal the container openings until ready for use and mixing, e.g., as described hereinabove with respect to FIGS. 8A-8C.

According to an embodiment of the present invention, the container unit 1 further comprises a second sealable opening located at a bottom end of the container body as described hereinabove with respect to FIG. 4. The second sealable opening can be larger than the first opening at the neck portion, for enabling to easily fill the container unit 1 with the first substance or component.

As will be appreciated by the skilled person the arrangement described in the figures results in a container unit which is capable of enabling engagement with a second container for combining the volume of both containers.

An additional advantage provided by the invention is the ability to perform a gentle mixing of the formulation, while the container unit is coupled to the second container.

All the above description and examples have been given for the purpose of illustration and are not intended to limit the invention in any way. Many different coupling mechanisms can be employed, all without exceeding the scope of the invention.

The invention claimed is:

1. A container unit for enabling flow-communication with a second container unit while engaging the second container unit to form an extended single compartment container by combining the volume of both containers and expanding the available mixing space, comprising:
   a) a neck portion part comprises:
      i) a cylindrically shaped portion at an upper end of the neck portion part, including a sealable opening, wherein said neck portion part configured to be inserted into an opening of the second container unit;
      ii) a ring-like seal located at the upper end of the neck portion part, the ring-like seal is a disk-like sealing flange formed of flexible material and sized wider than said opening of the second container unit to seal said opening of the second container unit when inserted therein, wherein said ring-like seal portion is configured to be inserted into said opening of the second container unit, wherein the ring-like seal forms a fluid-tight seal with an inside wall surface of said opening of the second container unit when the top end of the container unit is inserted into said opening of the second container unit, whereby said container unit is in flow-communication with the second container unit through the top open end of the container unit and said opening of the second container unit; and
      iii) a shoulder spaced apart from said ring-like seal, wherein said shoulder sized and configured to sit on and engage to an open edge of said opening of said second container unit, so that while said cylindrically shaped portion of said neck portion part is inserted into said opening of said second container, said shoulder forms a removable abutting relation with the open edge of the second container;

b) a container body part with an opening at a top end; wherein the container body part and the neck portion part are being sealingly coupled to form said container unit.

2. The container unit according to claim 1, further comprising an additional shoulder spaced apart from the shoulder, wherein said additional shoulder sized and configured to sit on the open edge of the second container.

3. The container unit according to claim 1, in which the ring-like seal is detachable.

4. The container unit according to claim 1, further comprising a second sealable opening located at a bottom portion of the container body and a corresponding bottom lid for closing said second sealable opening.

5. The container unit according to claim 1, further comprising an upper lid adapted for closing the first sealable opening.

6. The container unit according to claim 5, in which the upper lid and a bottom portion at the container body form a stackable mechanism adapted to stack plurality of container units one above the other, wherein the bottom portion of each container unit being configured to allow the container unit to be interlocked with the top of each upper lid such that two or more container units are connectable to each other as well as easily disassembled.

7. The container unit according to claim 6, in which the bottom portion includes a second sealable opening and a corresponding bottom lid for closing said second sealable opening.

8. The container unit according to claim 1, further comprising at least one additional ring-like seal.

9. The container unit according to claim 1, in which at least part of the container body having a conic form that can be used as the shoulder.

10. The container unit according to claim 1, in which a second sealable opening at a bottom portion of the container is sealed by a laminate.

11. The container unit according to claim 1, in which the shoulder is part of the neck part.

12. The container unit according to claim 1, in which the ring-like seal includes at least one perforation in order to avoid generation of air pressure while inserting the neck part into the second container.

13. The container unit according to claim 8, in which the at least one additional ring-like seal includes at least one perforation in order to avoid generation of air pressure while inserting the neck part into the second container.

* * * * *